(12) United States Patent
Floratou et al.

(10) Patent No.: US 11,093,541 B2
(45) Date of Patent: Aug. 17, 2021

(54) TRANSFORMING AN ONTOLOGY QUERY TO AN SQL QUERY

(71) Applicant: International Business Machines Corporation, Armonk, NY (US)

(72) Inventors: Avrilia Floratou, San Jose, CA (US); Fatma Ozcan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 979 days.

(21) Appl. No.: 15/213,227

(22) Filed: Jul. 18, 2016

(65) Prior Publication Data

US 2018/0018329 A1 Jan. 18, 2018

(51) Int. Cl.
*G06F 16/00* (2019.01)
*G06F 16/36* (2019.01)
*G06F 16/2452* (2019.01)

(52) U.S. Cl.
CPC ........ *G06F 16/367* (2019.01); *G06F 16/2452* (2019.01)

(58) Field of Classification Search
CPC .......................... G06F 16/2452; G06F 16/367
See application file for complete search history.

(56) References Cited

U.S. PATENT DOCUMENTS

| | | | |
|---|---|---|---|
| 8,060,531 B2 | 11/2011 | Edelstein et al. | |
| 8,140,556 B2 | 3/2012 | Rao et al. | |
| 8,566,347 B1* | 10/2013 | Patil | G06F 17/30342 707/769 |
| 2006/0036592 A1* | 2/2006 | Das | G06F 16/2448 |
| 2006/0161544 A1* | 7/2006 | Lee | G06F 17/3043 |
| 2007/0130206 A1* | 6/2007 | Zhou | G16H 10/60 |
| 2008/0172353 A1* | 7/2008 | Lim | G06F 16/24564 706/47 |
| 2010/0077342 A1* | 3/2010 | Perl | G06F 9/451 715/784 |
| 2012/0102022 A1* | 4/2012 | Miranker | G06F 17/30569 707/713 |
| 2016/0070769 A1 | 3/2016 | Joshi et al. | |

OTHER PUBLICATIONS

Gali et al., "From Ontology to Relational Databases," ER Workshops 2004, LNCS 3289, Springer-Verlag, 2004, pp. 1-12.
Lin, "Automatic Retrieval and Clustering of Similar Words," In Proceedings of the 17th International Conference on Computational Linguistics—vol. 2, 1998, pp. 768-774.
Spanos et al., "Bringing Relational Databases into the Semantic Web: A Survey," Semantic Web 0, IOS Press, Apr. 2012, pp. 1-41.
Prud'Hommeaux et al., "A Mapping of SPARQL Onto Conventional SQL," Retrieved From https://www.w3.org/2008/07/MappingRules/StemMapping, Retrieved on Jul. 18, 2016, pp. 1-18.
Feinerer et al., "WordNet Interface," Version 0.1-11, Jan. 2016, pp. 1-14.
Prud'Hommeaux et al., "SPARQL Query Language for RDF," W3C Recommendation, Jan. 2008, Retrieved From https://www.w3.org/TR/rdf-sparql-query/, Retrieved on Jul. 18, 2016, 1-93.

* cited by examiner

*Primary Examiner* — Dinku W Gebresenbet
(74) *Attorney, Agent, or Firm* — Zilka-Kotab, P.C.

(57) ABSTRACT

A computer-implemented method according to one embodiment includes receiving an ontology language query, receiving a mapping of an ontology to a relational database, and generating a structured query language (SQL) query, utilizing the ontology language query and the mapping of the ontology to the relational database.

21 Claims, 8 Drawing Sheets

TRANSFORMING AN ONTOLOGY QUERY TO AN SQL QUERY

BACKGROUND

The present invention relates to entity and relationship descriptions, and more specifically, this invention relates to converting an ontology language query to a SQL query.

Domain specific ontologies are frequently used to describe various semantic entities and the relationships between them. They are useful tools for domain adaptation of generic solutions. These ontologies not only capture the semantics of a domain but also provide a standard description of the domain for applications to use. However, there is currently a need for an efficient way to convert a query over a domain-specific ontology to a SQL query that will be executed over a relational store that contains the data that corresponds to this ontology.

SUMMARY

A computer-implemented method according to one embodiment includes receiving an ontology language query, receiving a mapping of an ontology to a relational database, and generating a structured query language (SQL) query, utilizing the ontology language query and the mapping of the ontology to the relational database.

According to another embodiment, a computer program product for transforming an ontology language query to a structured query language (SQL) query comprises a computer readable storage medium having program instructions embodied therewith, wherein the computer readable storage medium is not a transitory signal per se, and where the program instructions are executable by a processor to cause the processor to perform a method comprising receiving, utilizing the processor, the ontology language query, receiving, utilizing the processor, a mapping of an ontology to a relational database, and generating, utilizing the processor, the SQL query, utilizing the ontology language query and the mapping of the ontology to the relational database.

A system according to another embodiment includes a processor, and logic integrated with the processor, executable by the processor, or integrated with and executable by the processor, where the logic is configured to receive an ontology language query, receive a mapping of an ontology to a relational database, and generate a structured query language (SQL) query, utilizing the ontology language query and the mapping of the ontology to the relational database.

A computer-implemented method according to another embodiment includes identifying a concept referenced by an ontology language query, determining that the concept has an inheritance relationship, and transforming a portion of the ontology language query by deriving a property referenced by the ontology language query from a corresponding parent or union concept, in response to the determining.

A computer-implemented method according to another embodiment includes identifying a concept referenced by an ontology language query, determining that the concept has a union relationship, and transforming a portion of the ontology language query by deriving a property referenced by the ontology language query from corresponding properties of member concepts.

Other aspects and embodiments of the present invention will become apparent from the following detailed description, which, when taken in conjunction with the drawings, illustrate by way of example the principles of the invention.

DETAILED DESCRIPTION

Figure 1:
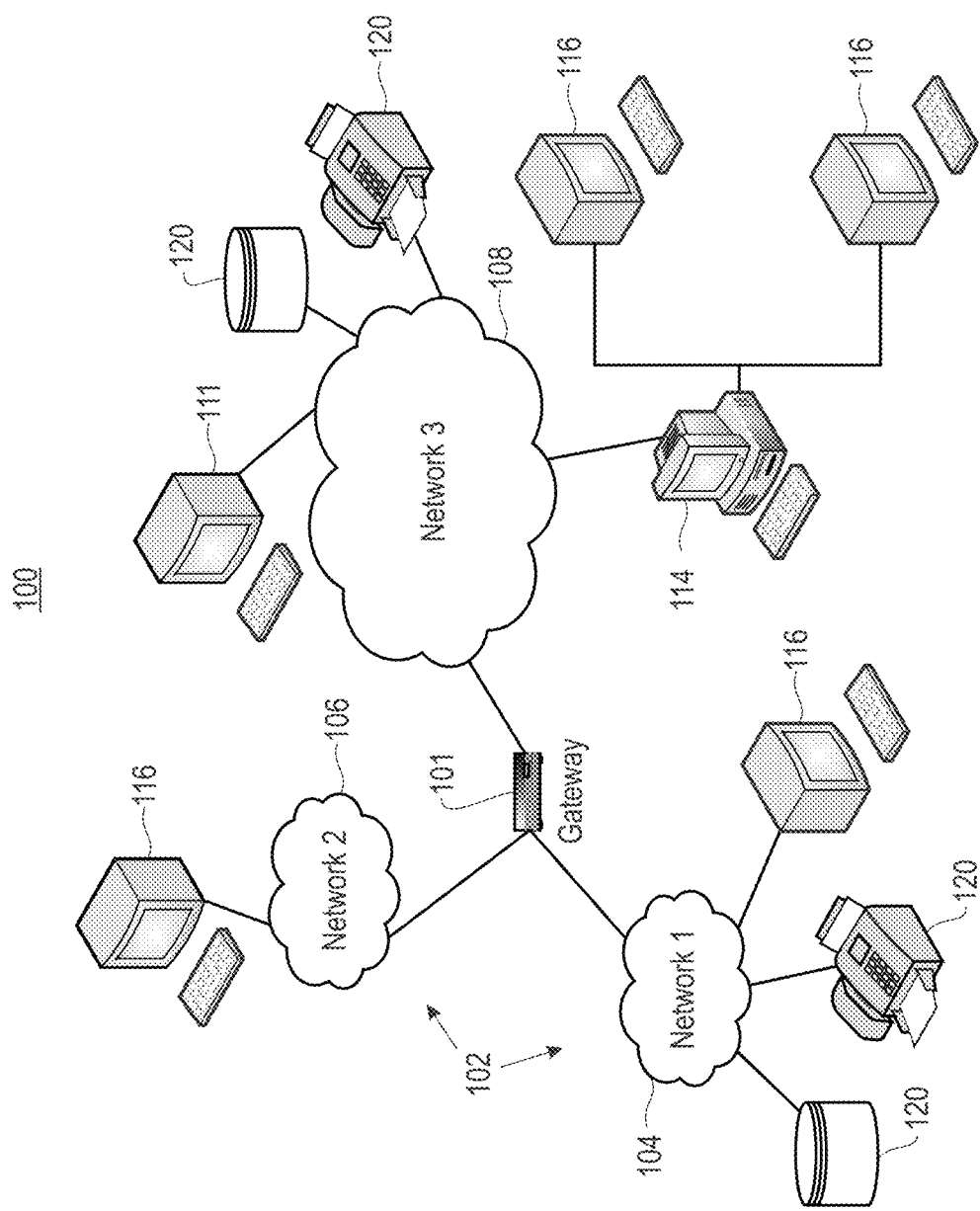
FIG. 1 illustrates a network architecture, in accordance with one embodiment.

The following description discloses several preferred embodiments of systems, methods and computer program products for transforming an ontology query to an SQL query. Various embodiments provide a method to generate an SQL query utilizing an input ontology language query and a mapping of an ontology to a relational database.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for transforming an ontology query to an SQL query.

In one general embodiment, a computer-implemented method includes receiving an ontology language query, receiving a mapping of an ontology to a relational database, and generating a structured query language (SQL) query, utilizing the ontology language query and the mapping of the ontology to the relational database.

In another general embodiment, a computer program product for transforming an ontology language query to a structured query language (SQL) query comprises a computer readable storage medium having program instructions embodied therewith, wherein the computer readable storage medium is not a transitory signal per se, and where the program instructions are executable by a processor to cause the processor to perform a method comprising receiving, utilizing the processor, the ontology language query, receiving, utilizing the processor, a mapping of an ontology to a relational database, and generating, utilizing the processor, the SQL query, utilizing the ontology language query and the mapping of the ontology to the relational database.

In another general embodiment, a system includes a processor, and logic integrated with the processor, executable by the processor, or integrated with and executable by the processor, where the logic is configured to receive an ontology language query, receive a mapping of an ontology to a relational database, and generate a structured query language (SQL) query, utilizing the ontology language query and the mapping of the ontology to the relational database.

In another general embodiment, a computer-implemented method includes identifying a concept referenced by an ontology language query, determining that the concept has an inheritance relationship, and transforming a portion of the ontology language query by deriving a property referenced by the ontology language query from a corresponding parent or union concept, in response to the determining.

In another general embodiment, a computer-implemented method includes identifying a concept referenced by an ontology language query, determining that the concept has a union relationship, and transforming a portion of the ontology language query by deriving a property referenced by the ontology language query from corresponding properties of member concepts.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
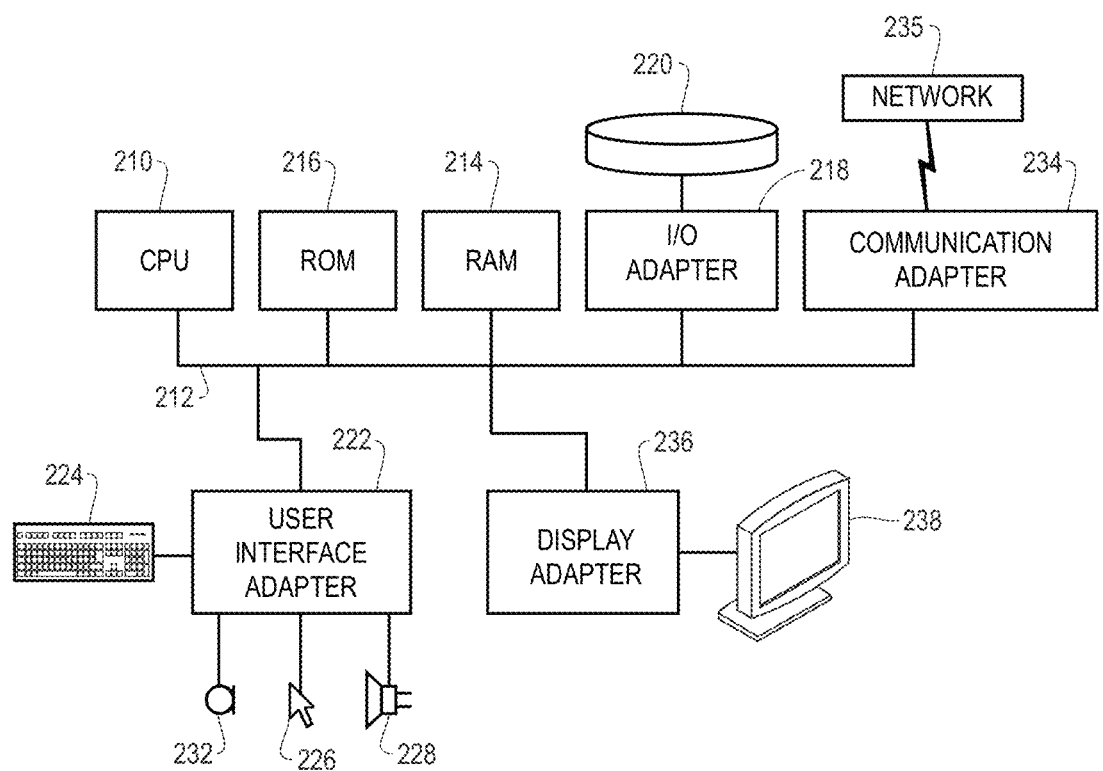
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
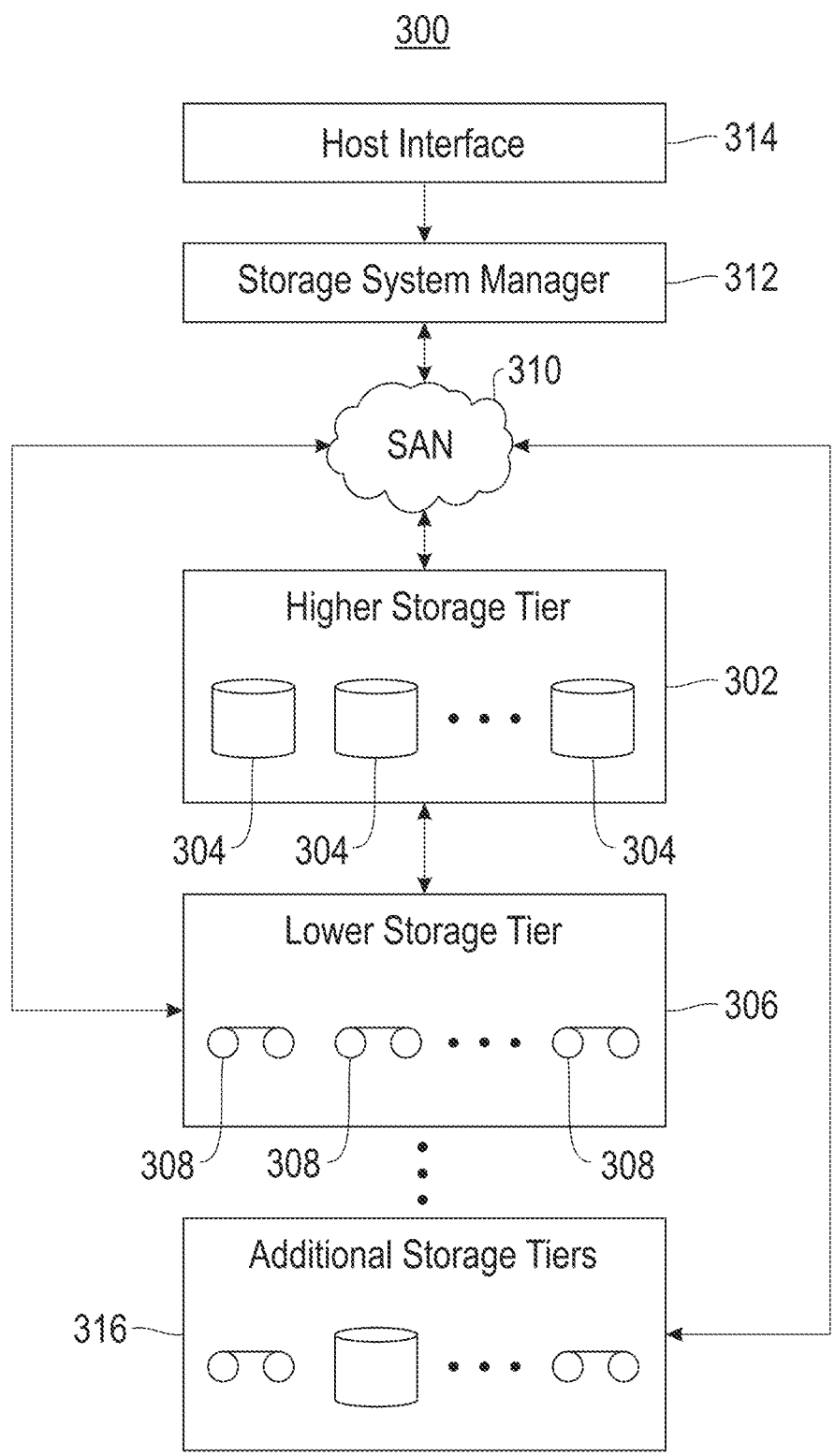
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
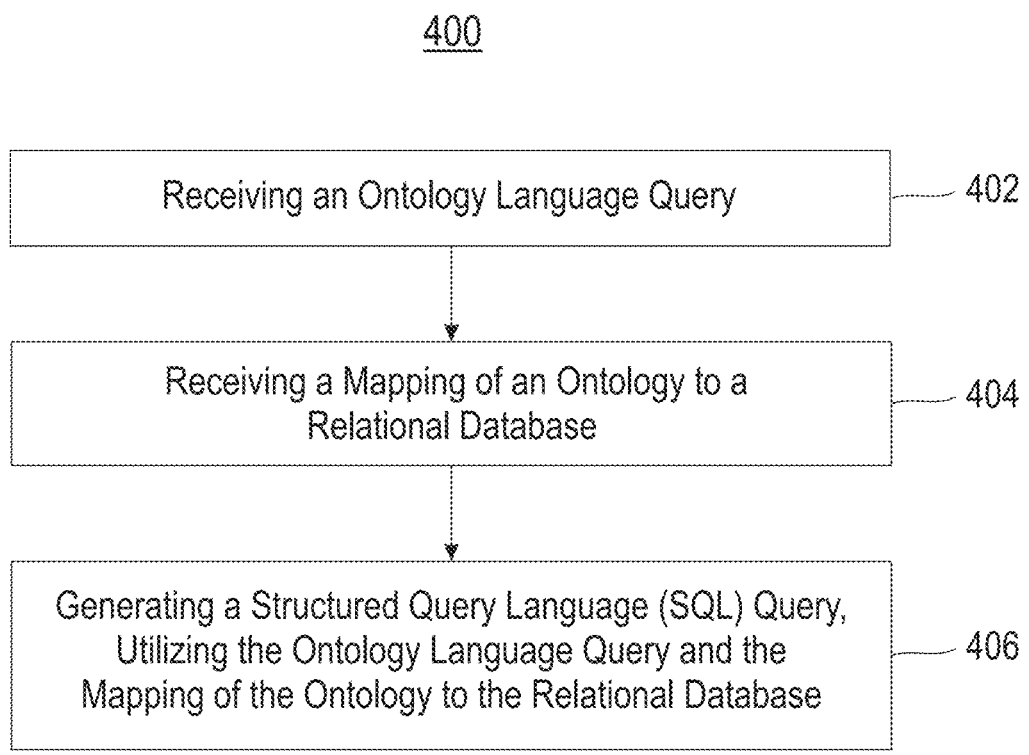
FIG. 4 illustrates a method for transforming an ontology query to an SQL query, in accordance with one embodiment.

Now referring to FIG. 4, a flowchart of a method 400 is shown according to one embodiment. The method 400 may be performed in accordance with the present invention in any of the environments depicted in FIGS. 1-3 and 5-8, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where an ontology language query is received. In one embodiment, the ontology language query may be received by a system as an input to a system by a user. In another embodiment, the ontology language query may include a query for data organized within a domain-specific ontology. In yet another embodiment, the ontology language query may include a union of a plurality of ontology language queries.

Additionally, in one embodiment, the ontology language query may include a query created utilizing an ontology language (e.g., an ontology query language (OQL), etc.). In another embodiment, the ontology may describe data, entities, and relationships. For example, the ontology may include semantic information that describes semantic entities and how they are related (e.g., utilizing relationship information, etc.).

Further, in one embodiment, the ontology may include a set of concepts. For example, the ontology domain may include one or more entities that are grouped into one or more concepts based on the similarity of characteristics between the entities. In another embodiment, the ontology may include a set of relations. For example, the ontology may include a set of relations that represent relationships between concepts. In another example, the relationships may include one or more associated types that indicate one or more of hierarchy and inheritance information (e.g., membership relations, inheritance relations, functional relations, etc.).

Further still, in one embodiment, the ontology may include a set of properties. For example, a property of a concept may represent a characteristic of the concept. In another embodiment, the ontology language query may include a set of attributes and a set of join conditions. For example, each attribute within the ontology language query may represent a property, and may reference one or more concepts. In another example, each join condition within the ontology language query may illustrate how concepts referenced in the ontology language query are connected within the ontology.

Further, as shown in FIG. 4, method 400 may proceed with operation 404, where a mapping of an ontology to a relational database is received. In one embodiment, the mapping may be received by the system as an input to the system by the user. In another embodiment, the ontology described within the mapping may also be the ontology that the ontology language query is based on. In yet another embodiment, the mapping may include one of a plurality of possible mappings of the ontology to the relational database. For example, the mapping may utilize one of a plurality of possible relational schemas.

In addition, in one embodiment, the mapping may describe how elements of the ontology are mapped to objects stored in the relational database. In another embodiment, the relational database may include a set of tables, fields, and constraints. In yet another embodiment, the mapping may map the ontology to the database utilizing a plurality of mapping functions.

For example, each concept in the ontology may be mapped to a table of the relational database using a first function. In another example, ontology properties may be mapped to corresponding database fields using a second function. In one embodiment, one or more of inheritance, union, and join concepts may be mapped directly through the second function. In another embodiment, one or more of inheritance, union, and join concepts may not be explicitly mapped and may be derived indirectly from concept properties.

Further, in one example, each table representing a concept that does not include an inheritance concept, a union concept, or a join concept may include all database fields corresponding to the properties of the concept. In another example, one or more relationships between concepts of the ontology may be mapped to one or more constraints (e.g., referential integrity constraints, etc.) between database tables using a third function.

In addition, as shown in FIG. 4, method 400 may proceed with operation 406, where a structured query language (SQL) query is generated, utilizing the ontology language query and the mapping of the ontology to the relational database. In one embodiment, generating the SQL query may include analyzing the ontology language query. For example, generating the SQL query may include determining a type of attributes and join conditions within the ontology language query.

Also, in one embodiment, one or more attributes and join conditions within the ontology language query may be of a concrete type. For example, a concrete type may indicate a direct mapping between ontology elements and objects within the relational database. In another embodiment, one or more attributes and join conditions within the ontology language query may be of a virtual type. For example, a virtual type may indicate a multi-layered relationship between ontology elements and database objects. For instance, a virtual type may indicate that a property referenced by the ontology language query is not represented as a field in a table of the relational database that corresponds to the concept referenced by the ontology language query.

Additionally, in one embodiment, generating the SQL query may include directly translating the ontology language query into the SQL query when it is determined that the ontology language query includes only attributes and join conditions of a concrete type. For example, when it is determined that the ontology language query includes only attributes and join conditions of a concrete type, the ontology language query may be converted into an SQL query utilizing the mapping.

Further, in one embodiment, generating the SQL query may include determining that the ontology language query includes a set of attributes and a set of join conditions where one or more attributes and/or join conditions are of a virtual type. In another embodiment, upon determining that the ontology language query includes one or more attributes and/or join conditions of a virtual type, generating the SQL query may include performing one or more transformations on one or more attributes and join conditions within the ontology language query until all attributes and join conditions of the ontology language query are of a concrete type to create a transformed ontology language query, and then directly translating the transformed ontology language query into the SQL query.

Further still, in one embodiment, each of the one or more transformations may derive a property for an attribute from another concept connected to a concept referenced by the ontology language query through an inheritance relation or a membership relation. For example, a concept referenced by the ontology language query may be connected to a plurality of additional concepts through multiple different relation paths, and every path may be explored until a concept is found for which the attribute becomes a concrete type.

In another embodiment, generating the SQL query may include assigning a virtual type to the attribute and attempting to retrieve a value for the attribute from a parent concept in the ontology, when it is determined that the ontology language query includes an attribute having a NULL value.

Also, in one embodiment, a concept referenced by the ontology language query may have an inheritance or membership relationship. For example, the referenced concept may include a child concept or a member concept. In another embodiment, generating the SQL query may include performing a transformation that derives a property referenced by the ontology language query from a corresponding parent or union concept. In yet another embodiment, generating the SQL query may include performing a transformation that replaces an attribute of the ontology language query with a new attribute that refers to the property referenced by the ontology language query but references a parent or union concept via an alias. In still another embodiment, the transformation may also create a new join condition between parent and child concepts (or union and member concepts).

In addition, in one embodiment, a concept referenced by the ontology language query may be a union concept. In another embodiment, generating the SQL query may include performing a transformation that derives a property referenced by the ontology language query from corresponding properties of member concepts. For example, the ontology language query may be replaced with a set of new queries, where each new query may reference one of the member concepts. In another example, the attribute that associates the property referenced by the ontology language query with the union concept may be replaced with one that refers to the referenced property but associates the property with the referenced concept.

Furthermore, in one embodiment, generating the SQL query may include performing a join condition transformation. For example, generating the SQL query may include identifying two tables that correspond to concepts referenced by the ontology language query that cannot be joined directly and that use an auxiliary table in the join path. In another example, the transformation may create a dummy concept to represent the auxiliary table, and the original join condition may then be divided into two join conditions that have a concrete type.

Further still, generating the SQL query may include determining that the ontology language query includes a union of a plurality of ontology language queries. In another embodiment, generating the SQL query may include translating each of the plurality of ontology language queries into equivalent SQL queries, and adding the SQL queries to a result set. In yet another embodiment, generating the SQL query may include applying a union operation (e.g., a SQL UNION operator) on the SQL queries of the result set to generate the final SQL query.

In this way, a query over a domain-specific ontology may be converted to a SQL query that will be executed over a relational store that contains the data that corresponds to the ontology. In one embodiment, a declarative ontology query language may be used. Further, the ontology language may include any language that provides constructs for selection, grouping, aggregation, joins, and iteration over sets of ontology concepts.

Further, the translation may not make any assumptions about the underlying relational schema, and may adjust its behavior to different schemata. Further still, the advanced semantics of the ontology (e.g., membership and inheritance relations) may be explored in order to formulate semantically correct SQL queries.

Figure 5:
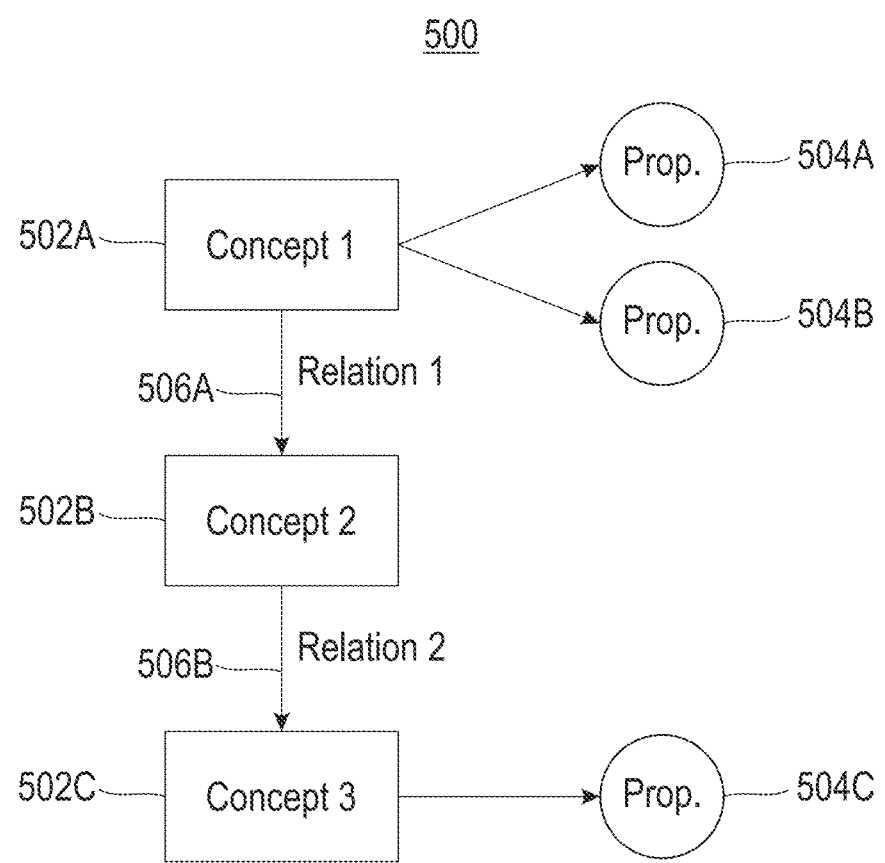
FIG. 5 illustrates an exemplary ontology, in accordance with one embodiment.

FIG. 5 illustrates an exemplary ontology 500, according to one embodiment. As shown, the exemplary ontology 500 includes a plurality of concepts 502A-C of a domain. Additionally, the exemplary ontology 500 includes a plurality of properties 504A-C. Specifically, concept 502A has properties 504A and 504B, and concept 502C has property 504C. Further, the exemplary ontology 500 includes a plurality of relations 506A-B. Specifically, concept 502A and concept 502B have relation 506A, and concept 502B and concept 502C have relation 506B.

In one embodiment, the exemplary ontology 500 may encompass a predetermined domain. For example, the exemplary ontology 500 may include a financial domain ontology. For example, the concepts 502A-C of the domain may include an investment, an investee, a company, etc. In another example, the properties 504A and 504B may include a type, a date, etc. In yet another example, the relations 506A-B may include an indication that an investment was made for a company, etc.

Additionally, in one embodiment, the exemplary ontology 500 may contain hierarchies between concepts. For example, relation 506A between concept 502A and concept 502B may include a hierarchical relationship, and the concept 502B may thus inherit the properties of the concept 502A (e.g, properties 504A and 504B) etc.). In this case, concept 502B may be called a child concept, concept 502A may be called a parent concept, and the relation 506A may include an inheritance relationship.

Further, in one embodiment, one or more of the concepts 502A-C may be part of a membership relationship. For example, one or more of the concepts 502A-C may be linked via a union relationship to a union concept, and the linked concepts 502A-C may then be member concepts.

Figure 6:
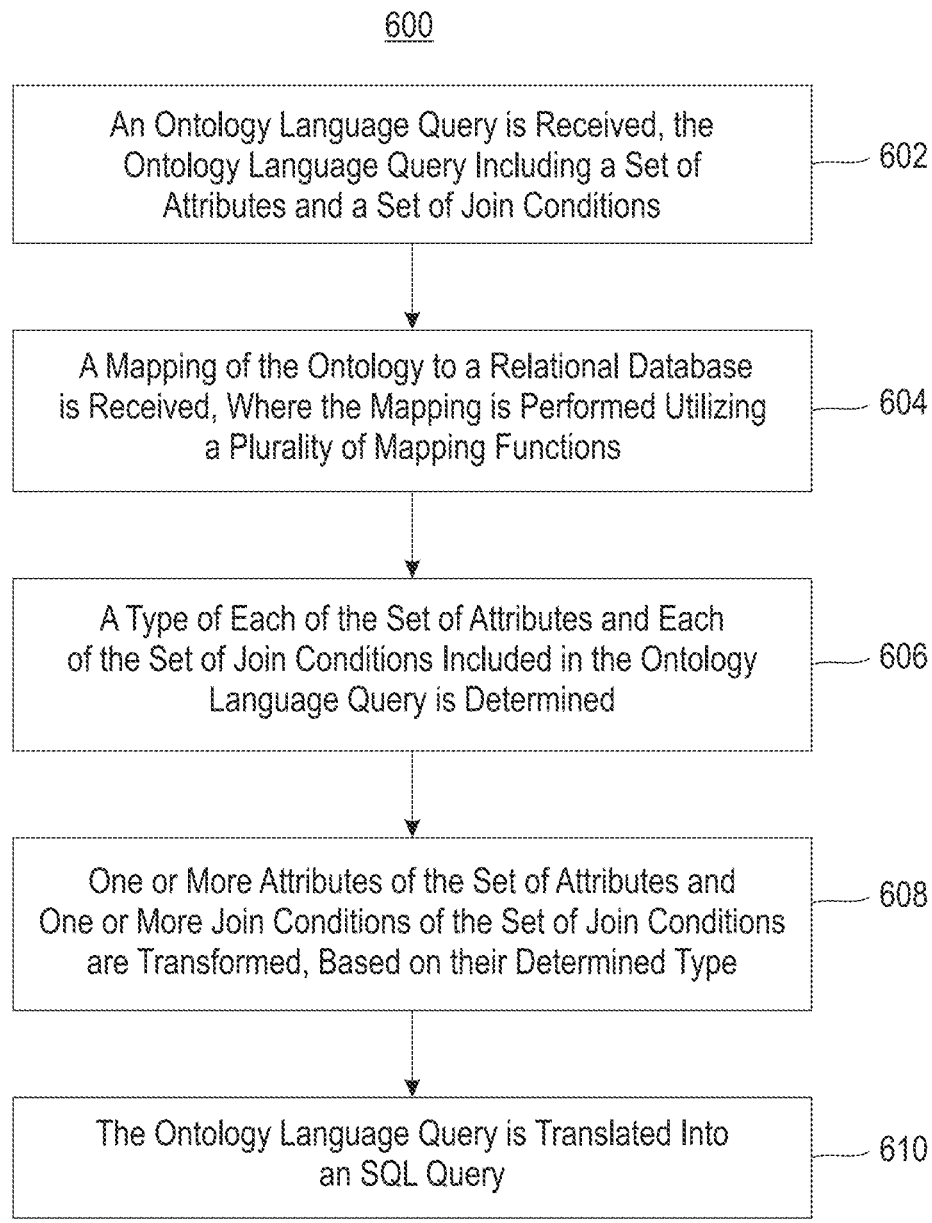
FIG. 6 illustrates a method for performing an ontology query conversion, in accordance with one embodiment.

Now referring to FIG. 6, a flowchart of a method 600 for performing an ontology query conversion is shown according to one embodiment. The method 600 may be performed in accordance with the present invention in any of the environments depicted in FIGS. 1-5 and 7-8, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where an ontology language query is received, the ontology language query including a set of attributes and a set of join conditions. In one embodiment, the ontology language query may include a query associated with a predetermined domain specific ontology. For example, domain specific ontologies may be used to describe various semantic entities and the relationships between them. These ontologies may capture the semantics of a domain and may provide a standard description of the domain for applications to use.

Additionally, in one embodiment, an Ontology O=(C, R, P) may contain a set of concepts C={$c_n$, 1≤n≤N}, a set of relations R={$r_k$, 1≤k≤K} and a set of properties P={$p_m$, 1≤m≤M} that represent a real-world domain. The ontology domain may consist of real-world entities called individuals which are grouped into concepts based on similarity of characteristics. In another embodiment, a property may represent a characteristic of a concept and may belong uniquely to that concept. For example, $P_n$ is the set of properties belonging to concept $c_n \in C$ and P is the set of all properties. In another embodiment, the naming convention c·p may be used to refer to the property p that belongs to concept c, where c·p∈P). Each relation $r_k$=($c_i$,$c_j$)∈R may represent a relationship between the concepts $c_i$ and $c_j \in C$. In another embodiment, the term ontology element may be used to refer to a concept, property or relation of the ontology. Each ontology element may be associated with a set of synonyms which may be generated manually or semi-automatically.

Further, in one embodiment, the relations may have an associated type (e.g., membership, inheritance, functional, etc.). In another embodiment, the set $R_M$ may contain the membership relations where ($c_i$,$c_j$)∈$R_M$ denotes that the concept $c_i$ is a union concept and the concept $c_j$ is a member concept. The set $R_I$ may contain the inheritance relations where ($c_i$,$c_j$)∈$R_I$ denotes that the concept $c_i$ is a parent concept and that the concept $c_j$ is a child concept. In another embodiment, unlike a union concept, a parent concept may contain individuals that are not present in any of its child concepts. However, the child and the member concepts may inherit the properties of their parent or union concepts, respectively. Thus, the set P may include the inherited properties of all the child and member concepts. Finally, the set $R_F$ may contain the remaining relations of the ontology which may be called functional relations. The set of the ontology relations R may be defined as: R=$R_M \cup R_I \cup R_F$.

Further still, in one embodiment, a query Q over the ontology may be represented as a set of attributes $A_Q$ and a set of join conditions $J_Q$. An attribute may represent a particular property, such as InvestorCompany.name. In another embodiment, the attribute a=(c, alias, p) may reference the concept c (e.g., InvestorCompany) through the alias alias (e.g., InvestorCompany), and its property p (e.g., name). The concept c is the attribute's referenced concept and p is the attribute's referenced property. Additional information may be maintained about attribute a, such as aggregation functions, and predicates applied on the corresponding property, as well as its positions in the select, groupBy and orderBy lists. The join conditions may show how the concepts referenced in the query are connected in the ontology. The join condition j=($c_i$,$alias_i$,$c_j$,$alias_j$,r) refers to the concepts $c_i$ (through the alias al $alias_i$) and $c_j$ (through the alias $alias_j$), and to the relation r that connects them. For example, a possible join condition between the Investment and InvestorCompany concept aliases (and their corresponding concepts) may be created through the investedBy relation.

The attributes and join conditions may have an associated type, (e.g., concrete, virtual, etc.). This type distinction may allow the handling of various physical data representations. For example, the concrete type may imply that there is a direct mapping between the ontology elements referenced by the attribute or join condition, and the database objects of the relational schema. Additionally, the virtual type may imply that there is a complicated relationship between the ontology elements and the actual physical representation.

For example, let P=c·p be the full name of the property referenced by the attribute a. The attribute a may be concrete, if the function $\vec{F}(p)$ points to a database field that belongs to table $\vec{T}(c)$ and may be virtual when $\vec{F}(p)$ is not defined. In another example, the attribute associated with the InvestorCompany.name property may be concrete on a denormalized schema, since the property is mapped to a RInvestorCompany.name field. However, the property may be virtual on the normalized schema because in this case, the RInvestorCompany table may not contain a name field. The join condition j may be concrete, if the set $\vec{S}(r)$ contains only one FK constraint between the tables and $\vec{T}(c_i)$ and $\vec{T}(c_j)$ thus they can be joined directly. If more than one FK constraints are involved, the join condition may be considered virtual. This may happen when r is a many-to-many relation. In this case, one approach may be to create an auxiliary table that breaks the relation into two one-to-many relations and use two FK constraints to capture them. The sets $A_Q^C$ and $A_Q^V$ denote the concrete and virtual attributes of query Q, respectively. Similarly, the sets $J_Q^C$ and $J_Q^V$ denote the concrete and virtual join conditions. We denote as $J_Q^C$ and $J_Q^V$ the sets of concrete and virtual join conditions of query Q, respectively, where ($J_Q = J_Q^C \cup J_Q^V$) and as $A_Q^C$ and $A_Q^V$ the sets of concrete and virtual attributes of query Q, respectively, where ($A_Q = A_Q^C \cup A_Q^V$).

Note that sometimes, business rules may require an attribute to inherit its value from its parent class for the majority of the cases, but allow an overwrite of the parent's value in some cases. In that case, these rules may correspond to a class of attributes that are concrete but allow special "NULL" values, which imply inheritance from their parent class.

In these cases, as we will show next, these attributes may be treated as virtual and an attempt may be made to retrieve their value from their parent concept in the ontology. A query that consists of only concrete attributes and join conditions may be directly translated into a SQL query. This is because, in this case, the only database tables that may be accessed are the ones that correspond to the concepts explicitly referenced in the sets of attributes and join conditions and thus all the information required to generate SQL query may be captured.

Additionally, method 600 may proceed with operation 604, where a mapping of the ontology to a relational database is received, where the mapping is performed utilizing a plurality of mapping functions. In one embodiment, the data corresponding to the ontology may be stored in a Relational Store (RS). The schema of the RS may capture all the information that is contained in the ontology, and may be generated by an RS designer. In another embodiment, multiple relational schemata may conform to the same ontology. For example, the RS designer may create a denormalized, or a normalized schema, or may generate materialized views depending on application requirements. In yet another embodiment, the mapping may be provided by the RS designer and may comprise an Ontology-to-Database Mapping, which describes how the ontology elements (concepts, properties, and relations) are mapped to database objects (e.g., tables, views, columns, and referential integrity constraints).

In another embodiment, the system architecture may be independent of the underlying database schema which may allow an RS designer to incorporate any existing database without explicitly modeling the ontology elements. To operate on a specific relational schema, the RS designer may create the Ontology-to-Database Mapping which may describe how the ontology elements are mapped to the database objects.

For example, a relational database D=(T, F, S) consists of a set of tables T, a set of fields F, and a set of referential integrity constraints S. The term table may refer to both database tables and views. A field may belong uniquely to a table or a view, and F is the set of all fields. The set S may contain the referential integrity constraints between tables in T.

In one embodiment, the Ontology-to-Database Mapping ODM (O, D)=($\vec{T}, \vec{F}, \vec{S}$), may map an ontology o=(C, R, P) to a database D=(T, F, S) through the mapping functions $\vec{T}$, $\vec{F}$, and $\vec{S}$. The mapping functions may be provided to the system by an RS designer and they may satisfy certain requirements. For example, in a valid mapping, each concept in the ontology may be mapped to a database table or view through the function $\vec{T}:\mapsto T$. The function $\vec{F}:P \mapsto F$ may map the ontology properties to their corresponding database fields. Since the ontology allows for inheritance and membership relations, the system may offer two alternatives.

In the first alternative, the database designer may map the properties of the child, member or union concepts to fields in the database directly through the function $\vec{F}$. Alternatively, the system may derive them indirectly from the corresponding properties of the parent, union, or member concepts. A table or view that represents a concept that is not a child, a member or a union concept, may include all the database fields that correspond to this concept's properties.

In another embodiment, this model may not pose any restriction on the database schemata supported. For example, the RS designer may map concepts to arbitrarily complex view definitions which incorporate database fields that might belong to different tables. Finally, each relation between concepts of the ontology may be mapped to a set of referential integrity constraints between database tables through the function $\vec{S}:R \mapsto 2^S$.

Further, method 600 may proceed with operation 606, where a type of each of the set of attributes and each of the set of join conditions included in the ontology language query is determined. Further still, method 600 may proceed with operation 608, where one or more attributes of the set of attributes and one or more join conditions of the set of join conditions are transformed, based on their determined type.

In one embodiment, a normalized and denormalized relational schema may be used for the ontology. For example, both schemata may contain one table for each concept, named after the concept with the prefix "R" (e.g., the RCompany table represents the Company concept). Each table may contain a column for each property of the concept that it represents and a primary key column, named id. In the normalized schema, the tables that represent child concepts may contain only the id column and may be connected to the tables of their corresponding parent concept through a foreign key (FK) constraint. Thus, to retrieve the values of the InvestorCompany.name property, the RInvestorCompany and RCompany tables may be joined, and then a selection may be performed on the RCompany.name column. In the denormalized schema, the tables that represent child concepts may contain additional columns for all the properties that are inherited from their parent concept. Thus, a selection on the RInvestorCompany.name column may return the values of the InvestorCompany.name property.

In one embodiment, since an ontology query may be a union of individual ontology queries, a translation algorithm may maintain a set of ontology queries that may need to be translated into equivalent SQL queries (e.g., a QuerySet, etc.). The algorithm may also maintain a set of SQL queries which may be used to construct the final SQL query (e.g., a ResultSet, etc.). Each ontology query in the QuerySet may be represented as a set of attributes and a set of join conditions. The algorithm may operate on each query of the QuerySet, performing attribute and join condition transformations until all the virtual elements of the query become concrete. The query may then be converted into an equivalent SQL query. The transformations take a virtual element as input and produce new elements (concrete or virtual).

Additionally, in one embodiment, the algorithm may first find the attributes that are concrete but have NULL values in the database. These attributes may be subsequently treated as virtual and an attempt may be made to retrieve their value from their parent concept in the ontology. For example, if the attribute is NULL in the child table, its value may be picked up from its parent, otherwise, its value may be picked up from the child table.

Table 1 illustrates exemplary SQL instructions for implementing NULL values, in accordance with one embodiment. Of course, it should be noted that the exemplary SQL instructions shown in Table 1 are set forth for illustrative purposes only, and thus should not be construed as limiting in any manner.

TABLE 1 select case when isNull(c.attr) then p.attr else c.attr end
from parent p, child c
where p.id = c.id In a virtual attribute, the referenced property may not be represented as a field in the database table that corresponds to the referenced concept. The attribute transformations may derive the property from another concept that is connected with the referenced concept through an inheritance relation (e.g., an inheritance transformation) or through a membership relation (e.g., a membership transformation). In complex ontologies, the referenced concept may be connected to various concepts through multiple inheritance and membership relations. The translation algorithm may explore every path, backtracking when needed, until a concept for which the attribute becomes concrete is found.

Table 2 illustrates an exemplary translation algorithm, in accordance with one embodiment. Of course, it should be noted that the translation algorithm shown in Table 2 is set forth for illustrative purposes only, and thus should not be construed as limiting in any manner.

TABLE 2

Input: Ontology Query $Q_O$, Ontology $O = (C,R,P)$, Ontology-Database Mapping $ODM(O,D) = (\vec{T}, \vec{F}, \vec{S})$
Output: SQL Query $Q_{SQL}$ 1  Convert $Q_O$ to $Q = (A_Q, J_Q)$ where $A_Q = A_Q^C \cup A_Q^V$ and $J_Q = J_Q^C \cup J_Q^V$
2  Create $Alias_Q : C \mapsto List<Object>$ using the (concept, Object) pairs of $A_Q, J_Q$
3  Set QuerySet = $\{Q\}$ and ResultSet = $\{\ \}$
4  Find the attributes from $A_Q^C$ whose corresponding value in the database is NULL and place them in $A_Q^V$
5  while QuerySet is not empty do
6  | q = QuerySet.getNextQuery( )
   | // Attribute Transformations
7  | while $A_q^V$ is not empty do
8  |    | a : (c,alias,p) = $A_q^V$.getNextattribute( )
9  |    | r = getNextRelation(O, c, p)
10 |    | if r ∈ $R_I$ then
   |    |    | // Inheritance Transformation
11 |    |    | $c_p$ = getParentConcept(c, r)
12 |    |    | $alias_{new}$ = getNewAlias ($Alias_q, c_p$)
13 |    |    | Create $a_{new} = (c_p, alias_{new}, p)$ and place it in $A_q^C$ or $A_q^V$
14 |    |    | Create $j_{new} = (c_p, alias_{new}, c, alias, r)$ and place it in $J_q^C$ or $J_q^V$
15 |    | else
   |    |    | // Membership Transformation
16 |    |    | if c.isUnionConcept then
17 |    |    |    | for i ← 1 to c.NumberOfMembers do
18 |    |    |    |    | $c_i$ = getNextMember(O, c)
19 |    |    |    |    | Query $q_i = (A_{q_i}, J_{q_i})$ where $A_{q_i} = A_q, J_{q_i} = J_q$
   |    |    |    |    |    $Alias_{q_i} = Alias_q$
20 |    |    |    |    | $r_i = (c, c_i) \in R_M$
21 |    |    |    |    | $alias_i$ = getNewAlias ($Alias_{q_i}, c_i$)
22 |    |    |    |    | Create $a_{new} = (c_i, alias_i, p)$ and place it in $A_{q_i}^C$ or $A_{q_i}^V$
23 |    |    |    |    | Create $j_{new} = (c_i, alias_i, c, alias, r_i)$ and place it in $J_{q_i}^C$ or $J_{q_i}^V$
24 |    |    |    |    | QuerySet.add($q_i$)
25 |    |    |    | end
26 |    |    | QuerySet.remove(q)
27 |    |    | Goto Line 5
28 |    |    | else TABLE 2-continued

```
29  |  |  |  | c_u = getUnionConcept(c, r)
30  |  |  |  | alias_new = getNewAlias (Alias_q, c_u)
31  |  |  |  | Create a_new = (c_u,alias_new,p) and place it in A_q^C or A_q^V
32  |  |  |  | Create j_new = (c_u,alias_new,c,alias,r) and place it in J_q^C or
    |  |  |  |   J_q^V
33  |  |  | end
34  |  | end
35  |  | A_q^V.remove (a)
36  | end
    | // Join Condition Transformation
37  | while J_q^V is not empty do
38  |  | j: (c_i, alias_i, c_j, alias_j,r) = J_q^V.getNextJoinCondition( )
39  |  | Create fake concept c_f with $\vec{T}$ (c_f) = AuxiliaryTable ($\vec{S}$ (r))
40  |  | alias_f = getAlias (Alias_q, c_f)
41  |  | Create the fake relations r_f^1 = c_i, c_f), r_f^2 = (c_f, c_j)
42  |  | Create j_1 = (c_i, alias_i, c_f, alias_f, r_f^1) and j_2 = (alias_f, c_f, c_j, alias_j,
    |  |   r_f^2)
43  |  | J_q^V.remove(j)
44  |  | J_q^C.add(j_1, j_2)
45  | end
46  | q_res = generateSQL(A_q^C, J_q^C, ODM)
47  | ResultSet.add(q_res)
48  | QuerySet.remove(q)
49 end
50 Q_SQL = generateSQL(ResultSet)
```

Also, method 600 may proceed with operation 610, where the ontology language query is translated into an SQL query. In one embodiment, a join condition transformation may be applied when the two tables that correspond to the referenced concepts cannot be joined directly but an auxiliary table is involved in the join path. For example, the transformation may create a dummy concept to represent the additional table, and may break the original join condition into two concrete join conditions.

In another embodiment, after all the transformations have been applied and the query consists of only concrete elements, the corresponding SQL query may be generated, and may be added to the ResultSet. After all the queries in the QuerySet have been translated, the final SQL query may be generated by applying a SQL UNION operator on the queries of the ResultSet.

In this way, the translation may convert a query over an Ontology $O=(C, R, P)$ into a SQL query over a Database $D=(T, F, S)$, using the Ontology-to-Database Mapping ODM $(O, D)=(\vec{T}, \vec{F}, \vec{S})$. Further, the translation may not make any assumption about the underlying database schema.

Figure 7:
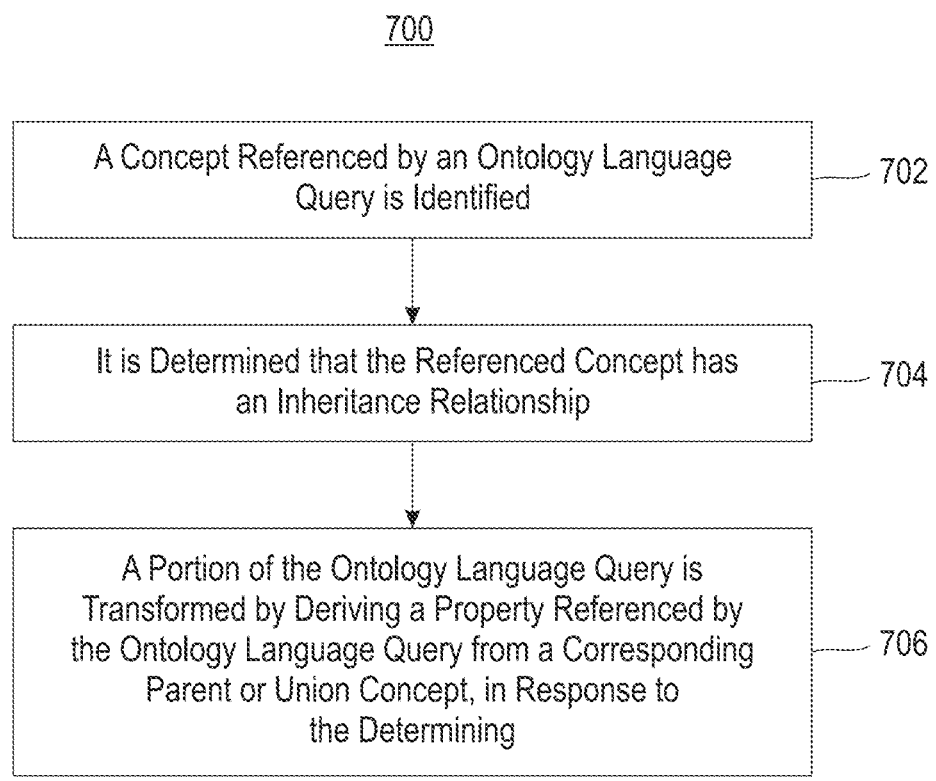
FIG. 7 illustrates a method for transforming an ontology language query that includes an inheritance relationship, in accordance with one embodiment.

Now referring to FIG. 7, a flowchart of a method 700 for transforming an ontology language query that includes an inheritance relationship is shown according to one embodiment. The method 700 may be performed in accordance with the present invention in any of the environments depicted in FIGS. 1-6 and 8, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a concept referenced by an ontology language query is identified. Additionally, method 700 may initiate with operation 704, where it is determined that the referenced concept has an inheritance relationship. Further, method 700 may proceed with operation 706, where a portion of the ontology language query is transformed by deriving a property referenced by the ontology language query from a corresponding parent or union concept, in response to the determining.

In one embodiment, when the referenced concept is a child concept or a member concept, the inheritance and membership transformations may attempt to derive the referenced property from its corresponding parent or union concept, respectively. For example, InvestorCompany.name and InvesteeCompany.name properties will be retrieved from a Company concept, where the Company concept is a union concept and InvestorCompany and InvesteeCompany are member concepts. Both transformations may replace the current attribute with a new one that still refers to the property but references the parent or union concept, through a new alias. The new alias may guarantee that the query remains semantically correct, in case the concept is already referenced in the ontology query. A new join condition between the parent and child (or union and member) concepts may also be created using the appropriate aliases (e.g, a join condition between the Company and InvestorCompany concepts, etc.). This join condition may ensure that the connection to the originally referenced child or member concept is still maintained. The new attribute and join condition may be virtual or concrete and will be processed accordingly.

Figure 8:
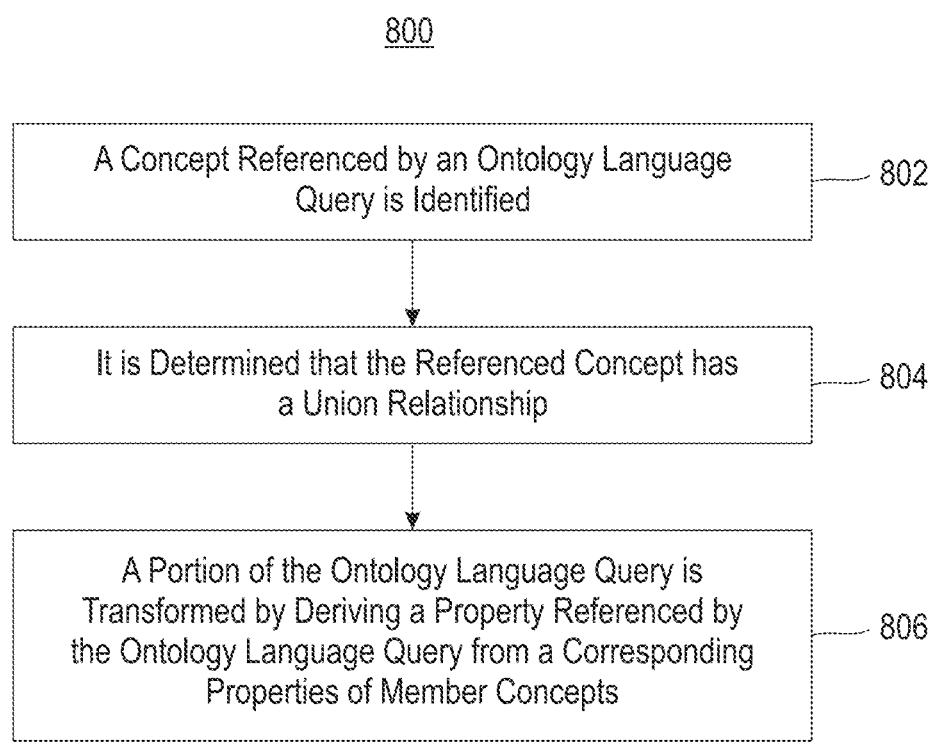
FIG. 8 illustrates a method for transforming an ontology language query that includes a union relationship, in accordance with one embodiment.

Now referring to FIG. 8, a flowchart of a method 800 for transforming an ontology language query that includes a union relationship is shown according to one embodiment. The method 800 may be performed in accordance with the present invention in any of the environments depicted in FIGS. 1-7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where a concept referenced by an ontology language query is identified. Additionally, method 800 may initiate with operation 804, where it is determined that the referenced concept has a union relationship. Further, method 800 may initiate with operation 806, where a portion of the ontology language query is transformed by deriving a property referenced by the ontology language query from corresponding properties of member concepts.

In one embodiment, In case the referenced concept is a union concept, the referenced property may be derived from the corresponding properties of the member concepts. The membership transformation may replace the current query in the QuerySet with a set of new queries, where each one references one of the member concepts. In each query, the attribute that associates the referenced property with the union concept may be replaced with one that still refers to the property but associates it with the currently processed member concept.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving an ontology language query;
receiving a mapping of an ontology to a relational database; and
generating a structured query language (SQL) query, utilizing the ontology language query and the mapping of the ontology to the relational database, including in response to determining that the ontology language query includes an attribute having a NULL value, assigning a virtual type to the attribute and attempting to retrieve a value for the attribute from a parent concept in the ontology.

2. The computer-implemented method of claim 1, wherein the ontology includes a set of concepts, a set of relations, and a set of properties.

3. The computer-implemented method of claim 1, wherein the mapping includes one of a plurality of mapping functions that perform mapping between the ontology and the relational database.

4. The computer-implemented method of claim 1, wherein the mapping describes how elements of the ontology are mapped to objects stored in the relational database.

5. The computer-implemented method of claim 1, wherein generating the SQL query includes determining a type of attributes and join conditions within the ontology language query.

6. The computer-implemented method of claim 1, wherein generating the SQL query includes directly translating the ontology language query into the SQL query in response to determining that the ontology language query includes only attributes and join conditions of a concrete type.

7. The computer-implemented method of claim 1, wherein generating the SQL query includes, in response to determining that the ontology language query includes an attribute or a join condition of a virtual type:
performing one or more transformations on one or more attributes and join conditions within the ontology language query until all attributes and join conditions of the ontology language query are of a concrete type to create a transformed ontology language query, and
translating the transformed ontology language query into the SQL query.

8. The computer-implemented method of claim 7, wherein each of the one or more transformations derives a property for an attribute from another concept connected to a concept referenced by the ontology language query through an inheritance relation or a membership relation.

9. The computer-implemented method of claim 1, wherein generating the SQL query includes determining that the ontology language query includes a union of a plurality of ontology language queries.

10. The computer-implemented method of claim 9, wherein generating the SQL query includes:
translating each of the plurality of ontology language queries into equivalent SQL queries;
adding the equivalent SQL queries to a result set; and
applying a union operation on the equivalent SQL queries of the result set to generate the SQL query.

11. The computer-implemented method of claim 1, further comprising executing the SQL query over the relational database.

12. The computer-implemented method of claim 1, wherein
generating the SQL query includes:
analyzing the ontology language query by determining a type of attributes and join conditions within the ontology language query;

directly translating the ontology language query into the SQL query in response to determining that the ontology language query includes only attributes and join conditions of a concrete type indicating a direct mapping between ontology elements and objects within the relational database; and in response to determining that the ontology language query includes one or more attributes and join conditions of a virtual type:

performing one or more transformations on one or more attributes and join conditions within the ontology language query until all attributes and join conditions of the ontology language query are of a concrete type to create a transformed ontology language query, and directly translating the transformed ontology language query into the SQL query.

13. The computer-implemented method of claim 1, wherein:

the mapping describes how elements of the ontology are mapped to objects stored in the relational database, each concept in the ontology is mapped to a table of the relational database using a first function, properties of the ontology are mapped to corresponding fields in the relational database using a second function, where inheritance, union, and join concepts are mapped directly through the second function, and one or more relationships between concepts of the ontology are mapped to one or more constraints between tables of the relational database using a third function.

14. The computer-implemented method of claim 1, wherein:

the ontology language query references one or more concepts included within the ontology, a domain of the ontology includes one or more entities that are grouped into each of the one or more concepts included within the ontology based on a similarity of characteristics between the entities, and the ontology includes a set of relations that represent relationships between the one or more concepts included within the ontology, where the relationships include one or more associated types that indicate hierarchy and inheritance information.

15. The computer-implemented method of claim 1, wherein:

the ontology includes a domain-specific ontology, the ontology language query includes a query for data organized within the domain-specific ontology, the ontology language query references one or more concepts included within the domain-specific ontology, the ontology language query includes a set of attributes and a set of join conditions, each of the set of attributes represents a property, and each of the set of join conditions illustrate how the one or more concepts included within the domain-specific ontology are connected within the domain-specific ontology.

16. A computer program product for transforming an ontology language query to a structured query language (SQL) query, the computer program product comprising a computer readable storage medium having program instructions embodied therewith, wherein the computer readable storage medium is not a transitory signal per se, the program instructions executable by a processor to cause the processor to perform a method comprising:

receiving, utilizing the processor, the ontology language query;

receiving, utilizing the processor, a mapping of an ontology to a relational database; and generating, utilizing the processor, the SQL query, utilizing the ontology language query and the mapping of the ontology to the relational database, including in response to determining that the ontology language query includes an attribute having a NULL value, assigning a virtual type to the attribute and attempting to retrieve a value for the attribute from a parent concept in the ontology.

17. The computer program product of claim 16, wherein the ontology includes a set of concepts, a set of relations, and a set of properties.

18. The computer program product of claim 16, wherein the mapping includes one of a plurality of mapping functions that perform mapping between the ontology and the relational database.

19. The computer program product of claim 16, wherein the mapping describes how elements of the ontology are mapped to objects stored in the relational database.

20. The computer program product of claim 16, wherein generating the SQL query includes determining, utilizing the processor, a type of attributes and join conditions within the ontology language query.

21. A system, comprising:

a processor; and logic integrated with the processor, executable by the processor, or integrated with and executable by the processor, the logic being configured to:

receive an ontology language query;

receive a mapping of an ontology to a relational database; and generate a structured query language (SQL) query, utilizing the ontology language query and the mapping of the ontology to the relational database, including in response to determining that the ontology language query includes an attribute having a NULL value, assigning a virtual type to the attribute and attempting to retrieve a value for the attribute from a parent concept in the ontology.

* * * * *